Figure 1:
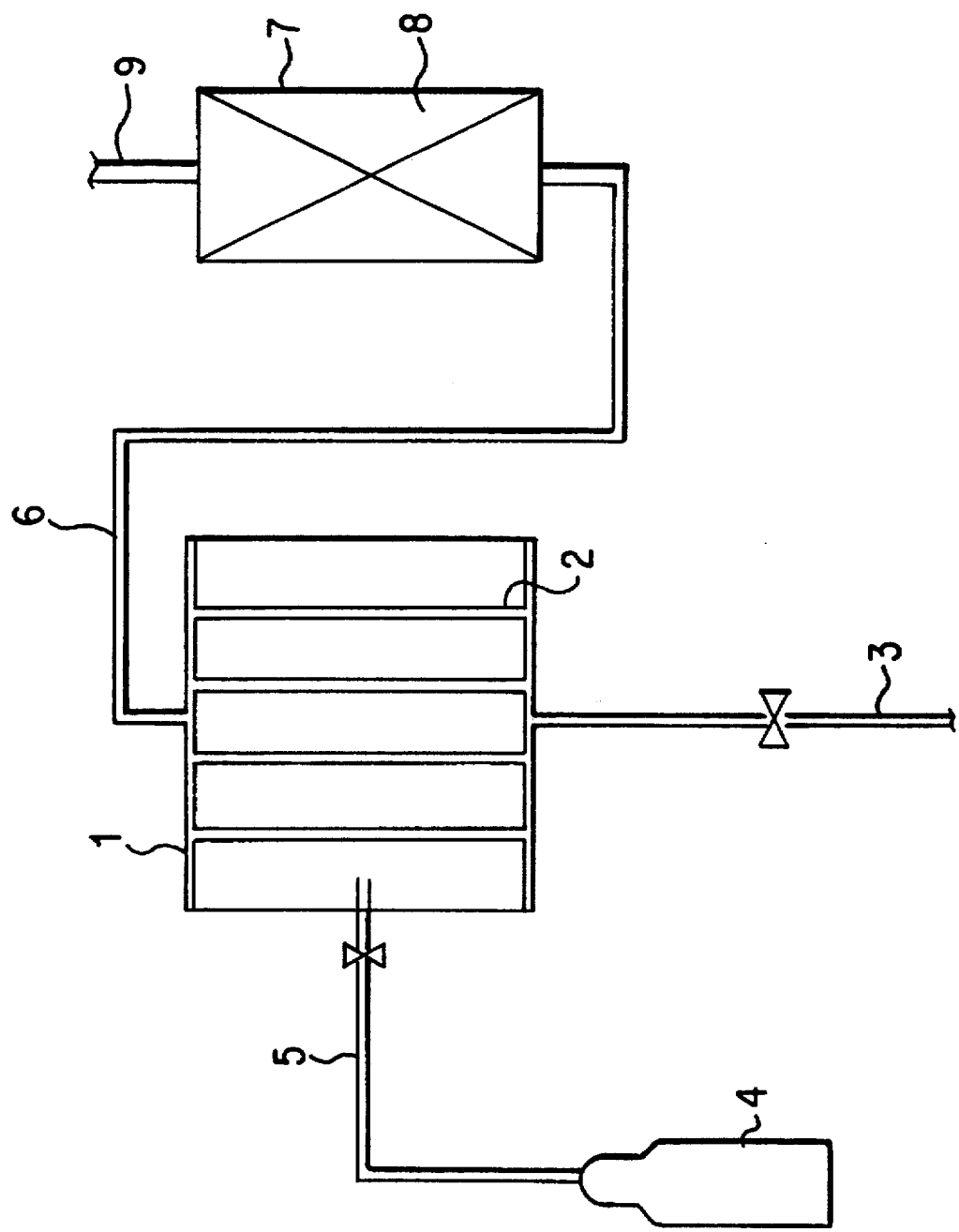

United States Patent [19]
Sell et al.

[11] Patent Number: 5,523,003
[45] Date of Patent: Jun. 4, 1996

[54] METHOD OF INTRODUCING HYDROGEN INTO AQUEOUS LIQUIDS WITHOUT FORMING BUBBLES

[75] Inventors: Michael Sell, Peine; Michael Bischoff, Braunschweig; Andreas Mann, Hanover; Rolf-Dieter Behling, Hamburg; Klaus-Viktor Peinemann; Klemens Kneifel, both of Geesthacht, all of Germany

[73] Assignee: Solvay Unmeltchemie GmbH, Hanover, Germany

[21] Appl. No.: 244,994

[22] PCT Filed: Dec. 16, 1992

[86] PCT No.: PCT/EP92/02924

§ 371 Date: Jun. 20, 1994

§ 102(e) Date: Jun. 20, 1994

[87] PCT Pub. No.: WO93/13022

PCT Pub. Date: Jul. 8, 1993

[30] Foreign Application Priority Data

Dec. 21, 1991 [DE] Germany .......................... 41 42 502.2

[51] Int. Cl.[6] ........................................................ C02F 1/70
[52] U.S. Cl. ........................... 210/757; 261/104; 261/107
[58] Field of Search ........................... 210/757; 261/104, 261/107

[56] References Cited

U.S. PATENT DOCUMENTS

| 3,520,416 | 7/1970 | Keedwell | 261/104 |
| 4,098,852 | 7/1978 | Christen et al. | 261/104 |
| 4,355,636 | 10/1982 | Oetjen et al. | 261/104 |
| 4,933,085 | 6/1990 | Kneifel et al. | 210/500.39 |
| 5,190,627 | 3/1993 | Saito et al. | 210/757 |
| 5,348,691 | 9/1994 | McElroy et al. | 261/104 |

FOREIGN PATENT DOCUMENTS

| 113574 | 7/1984 | European Pat. Off. |
| 291679 | 11/1988 | European Pat. Off. |
| 359074 | 3/1990 | European Pat. Off. |
| 448973 | 10/1991 | European Pat. Off. |
| 87/00517 | 1/1987 | WIPO |

*Primary Examiner*—Neil McCarthy
*Attorney, Agent, or Firm*—Evenson, McKeown, Edwards & Lenahan

[57] ABSTRACT

The invention relates to a method of introducing hydrogen into aqueous liquids without forming bubbles.

In this case, the introduction of the gas takes place through a composite membrane with a non-porous coating on the liquid side. Preferred fields of use relate to the charging of hydrogen into biologically or catalytically operating processes for the removal of oxygen, nitrite and/or nitrate from water.

11 Claims, 1 Drawing Sheet

METHOD OF INTRODUCING HYDROGEN INTO AQUEOUS LIQUIDS WITHOUT FORMING BUBBLES

The invention relates to a method of introducing hydrogen through a membrane into aqueous liquids without forming bubbles.

In a number of chemical, biological, biochemical and other technical processes, it is necessary to charge hydrogen into aqueous liquids, for example, during the biological reduction of substances with hydrogen or the reduction of substances with hydrogen promoted by catalysts, such as the biological or catalyzed reduction of oxygen, nitrite or nitrate in water.

Generally, the introduction of hydrogen may take place in the form of bubbles or without forming bubbles. Although the charging of gas in the form of bubbles is very simple to implement, it is inefficient. In contrast, the charging of gas without the formation of bubbles permits a better utilization of the gas to be introduced. The charging of hydrogen without the formation of bubbles through a membrane in water which contains nitrite and/or nitrate for the purpose of catalytically removing these harmful substances while selectively forming nitrogen is known from European Patent Document EP-A 359 074. The charging of gas without the formation of bubbles which was recognized to be advantageous takes place by way of non-porous unreinforced or fabric-reinforced silicone hoses or flat silicone membranes. Despite their large wall thicknesses, these silicone hoses can withstand little mechanical stress.

Published German Patent Application DE-OS 35 44 382 describes a process for supplying bioreactors with oxygen and an apparatus which can be used for this purpose. The oxygen is introduced into the aqueous phase without the formation of bubbles through a non-porous silicon membrane with a fabric-reinforcement. The silicone hoses which were described there as "thin-walled" have a wall thickness of from 0.2 to 0.5 mm. The transport rate for gases is low. Although the gas charging rate is improved when very high pressures are used, the risk of the formation of bubbles is increased. The discharge of gases dissolved in the water is also low. European Patent Application No. EP 0 448 973 describes a spiral-form, wound membrane for introducing a gas into water. The gas to be introduced with that membrane is not particularly limited; oxygen and carbon dioxide are preferred. The membrane comprises a carrier structure of porous polymer with a homogenous layer, which is in contact with the water.

The invention is based on the object of providing an improved method for introducing hydrogen into aqueous liquids without the formation of bubbles. This object is achieved by means of the process according to the invention indicated in the claims.

The method according to the invention for the introduction of hydrogen into aqueous liquids without the formation of bubbles, whereby the hydrogen is charged into the aqueous liquid through a membrane, is characterized in that a membrane is used which comprises a) a carrier structure formed of a porous polymer, and b) at least one layer of a non-porous polymer, the aqueous liquid on the side of the layer made of non-porous polymer being in contact with the membrane.

Composite membranes having an integral-asymmetrical construction are particularly suitable. They comprises a carrier structure which is formed of a porous polymer and has a microporous layer and a non-porous coating. Membranes of this type and their manufacture are described in European Patent Application EP-A 291 679 (U.S. Pat. No. 4,933,085).

The carrier structure with the microporous layer is normally manufactured in a single step and is preferably formed from hydrophobic water-resistant polymers, such as polysulfones, for example, polyethersulfones, polyamides, polyimides, or particularly polyetherimide.

The integral-asymmetrical composite membranes used according to the method of the invention have the following construction:

One side of the membrane is formed by a non-porous layer of a hydrophobic polymer. A microporous skin will then normally follow in the direction toward the other side of the membrane. This microporous skin will be adjoined by either a cavernous structure ("finger structure") or by a cavern-free sponge structure. Cavernous structures are more suitable for low pressures; sponge structures are more suitable for higher pressures. The thickness of the porous cavernous or sponge-type structure may fluctuate to a higher or lower degree depending on the desired stability of the membrane. Advantageously, the thickness will be in the range of from 15 to 200 micrometers.

Normally, the integral-asymmetrical membrane is manufactured first; its microporous layers is covered by a layer of a hydrophobic non-porous polymer. Layers are, for example, particularly suitable which are made of polymethylpentene and silicone polymer, particularly layers of polydialkylsiloxanes, such as polydimethylsiloxane. The thickness of this non-porous layer is between 0.1 to 100 micrometers, preferably between 0.5 and 10 micrometers.

The manufacture of integral-asymmetrical membranes and composite membranes, insofar as they are not commercially available, is described, for example, in European Patent Application EP-A 291 679.

The membrane may be constructed as a flat membrane, a tube membrane (diameter 4 to 15 mm or more) or preferably as a hollow-filament membrane.

If a hollow-filament membrane is used in the method according to the invention, the inside diameter is advantageously in the range of from 0.2 to 4 mm.

The dimension of the integral-asymmetrical membranes can be varied as desired, also with respect to the length. A plurality or multitude of individual membranes may also be arranged in modules or cassettes.

It was stated above that the aqueous liquid is in contact with the membrane on the side of the non-porous layer. The liquid is therby expediently conducted past the layer. It is particularly advantageous if this takes place in a turbulent flow because the mass transfer will then be improved.

If a hollow-filament-type membrane is used, the non-porous layer may be arranged in the interior of the filament (the aqueous liquid will then be conducted through the filament) or on the exterior side of the filament (the aqueous liquid will then flow around the fiber). (Of course, a membrane may also be used which has a non-porous layer on both sides.) Preferably, a hollow-filament-type membrane will be used whose non-porous layer is arranged on the interior side and in which the aqueous liquid is conducted through the lumen of the filament. Advantageously, turbulent conditions can be set.

The gas charging rate depends on various factors. The driving force for the transfer of the gas into the aqueous phase is the partial pressure difference of the gas to be charged between the gaseous phase and the aqueous phase. The higher the pressure difference on the gas side, the higher the gas charging rate. However, if the pressure difference is too high, the membrane may be damaged; in addition, there may be an undesirable formation of bubbles. A pressure is therefore expediently used which is below the pressure at which the undesirable formation of bubbles would start. The hydrogen pressure must be higher than the partial pressure of the hydrogen in the water. Desirably, the differential pressure between hydrogen gas and water is below 10 bar. If desired, the aqueous liquid may first be subjected to a pre-pressure before it comes in contact with the membrane. This improves the solubility of the gas to be charged.

Since, for the forming of undesirable gas bubbles during the gas charging operation, the sum of the partial pressures of the gases dissolved in the water is important, it may be advantageous to first remove other gases dissolved in the water, for example, by means of vacuum degassing or by means of adsorbers. The discharge of gases dissolved in the water also takes place through the membrane which is used. The discharge of the gases is controlled by the permeability of the membrane, in which case the partial pressure difference for the respective gas between the aqueous and the gaseous phase acts as the driving force. The very thin non-porous layer of the composite membrane which is used has a very favorable effect. The discharge of the undesirable gas from the water into the gas space naturally reduces the concentration and the partial pressure of the hydrogen to be charged into the water. However, the small amounts of the gas discharged from the water hardly have any effect. In cases in which in proportion to the volume of the gas space, a lot of gas is transported from the aqueous medium into this gas space, its influence can be limited by the fact that the gas which enters through the membrane into the gas space is removed by continuous or discontinuous rinsing. It is also possible to arrange an absorber material in the gas space which is suitable for the respective type of gas (predominantly oxygen, nitrogen and carbon dioxide). Water vapor which may possibly permeate through the membrane may also be removed by rinsing or absorption.

Preferably, the method according to the invention for the charging of hydrogen is combined with methods in which the hydrogen acts as an electron donor or as a reducing agent. These may, for example, be catalytic or non-catalytic chemical processes or biological processes. A combination of the method according to the invention for charging hydrogen with methods in which the oxygen content, the nitrite content and/or the nitrate content is to be reduced by means of hydrogen biologically, for example, within the scope of autotrophic denitrification, or catalytically, is particularly aadvantageous. Water with a low oxygen content is required, for example, because of the reduced corrosiveness. Water with a low oxygen content is also required in other fields of use, for example, in the beverage industry. A decrease in the nitrite or nitrate content is particularly undesirable in water which is required in different forms for human nutrition (as ground water, drinking water, water for the manufacture of beverages and food). It may also be desirable to reduce the nitrite or nitrate content in water for domestic use or in waste water.

A catalytically operating process for the reduction of the nitrite or nitrate content is described in the above-mentioned European Patent Application EP-A 359 074 (= U.S. Pat. No. 4,990,266). In that process, the nitrite and/or nitrate content is removed from the charged water with selective formation of $N_2$. For this purpose, hydrogen is charged into the water, and the water is then contacted with a catalyst. As active metals, this catalyst comprises palladium and/or rhodium or only palladium as the noble metal and a metal of the copper group on a porous carrier. In this case, the hydrogen is preferably charged into the water in an amount which corresponds at least to the quantity required for the reduction of the predetermined content of oxygen and nitrite and/or nitrate in a stoichiometric manner and to no more than an excess of 20%. The oxygen content, the nitrite or nitrate content of the water may vary within a wide range, for example, between 0 and 10 ppm (oxygen), 0 and 50 ppm (nitrite), and 0 to 500 ppm (nitrate).

The process is preferably carried out continuously. For this purpose, the nitrite-loaded and/or nitrate-loaded water with a predetermined content of oxygen, nitrite and/or nitrate is continuously conducted by means of a pump which controls the flow rate and has a variable capacity, through one or several reaction units which each comprise a gas charging container and a reactor, in which case the water is first guided into the gas charging container and in it is charged according to the method of the invention with hydrogen gas optionally under pressure and is mixed intimately and is then conducted through the reactor which contains a catalyst bed with the catalyst. If desired, the charged water may first be introduced in a dosing container in which the pH-value is checked and, if necessary, is adjusted to a value of no more than pH 8 by the addition of acid. For the purpose of sterilization, before the charging of the gas, the water may be conducted through a sterilizing device, such as an ultraviolet flow-through lamp. The charging of the gas and the catalytic conversion may be repeated as often as required for the reduction of the oxygen content and of the nitrite and/or nitrate content in the water. If desired, oxygen may be added to the denitrified water.

A system for carrying out this method for the removal of the nitrite and/or nitrate content from water comprises one or several reaction units, which are each formed of a gas charging container which is provided with a liquid inlet for the water and is provided at the opposite end with a liquid outlet for the water, and a membrane, preferably in a module form, which comprises a) a carrier structure formed of a porous polymer, and b) a layer made of hydrophobic non-porous polymer, and has an inlet for hydrogen gas which leads through this membrane, and, in this context, one reactor respectively which contains a catalyst bed with the above-described catalyst, which reactor has a liquid inlet for the water and a liquid outlet for the water and, if necessary, is provided with a pH-measuring and control device. The system may also contain a dosing container which has a liquid inlet for introducing the water and a liquid outlet for discharging the water and may possibly be provided with a pH-measuring and control chain. Furthermore, if desired, a sterilizing device may be provided, preferably a UV flow-through lamp. Also, pipes exist for the transport of the water into the different parts of the system. The gas charging containers are expediently arranged close to the reactor. As an alternative, the gas charging module may also be arranged directly in the reactor.

The invention has the considerable advantage that the gas charging with hydrogen by means of the composite membranes to be used according to the invention is by the factor 100 larger than, for example, in the case of the silicone hoses used in the method of the European Patent Document EP-A 359 074. Another advantage is that gases dissolved in the water can easily permeate through the composite membrane. As a result, a still higher charging of hydrogen becomes possible. In a preferred embodiment, in which hollow-filament-shaped membranes are used and the water to be charged with gas is guided through the membrane, there is also the possibility of adjusting turbulent conditions. This results in a particularly high hydrogen charge rate. Advantageously, the membranes are also very resistant to pressure; the equipment expenditures are low; and the required space is small. As a result, a very simple operation is possible.

The following example has the purpose of further explaining the method according to the invention without limiting its scope.

EXAMPLE 1

Charging of Hydrogen Within the Framework of a Catalytic Denitrification 1.1. Membrane Used Composite membranes in a hollow-filament form were used. As described in European Patent Document EP-A 291 679 (U.S. Pat. No. 4,933,085), the membranes were made of polyetherimide (Ulem 100$^R$, Manufacturer: General Electric) and, in addition, were provided on the interior side, with a non-porous layer of polydimethylsiloxane (VP 7660, Manufacturer: Wacker Chemie, München). The hollow filaments were cut to a length of 33 cm. Their outside diameter was 1.2 mm; the inside diameter was 1.0 mm. The bursting pressure in the case of an admission of pressure in the interior of the filaments was 20 bar; the bursting pressure in the case of an admission of pressure from the outside was 7 bar.

1.2.1. Used Hollow-Filament Membrane Module 400 of the hollow filaments described in Example 1.1. and having a layer of polydimethylsiloxane on the interior side are combined to a module. The membrane surface amounted to 0.415 m$^2$.

ground water well contains nitrate and had the following analysis data:

| | |
|---|---|
| pH-value: | 7.1 |
| Temperature: | 10° C. |
| Content of oxygen: | 3.9 mg |
| nitrate: | 52.0 mg/l |
| nitrite: | <0.01 mg/l |
| chloride: | 67.0 mg/l |
| sulfate: | 144.0 mg/l |
| hydrogen carbonate: | 262.0 mg/l |
| Total hardness: | 26 dH (German hardness) |
| Salt content: | 790 mg/l |

For improving the hydrogen solubility, the well water was brought to a pressure of from 4 to 6 bar. At different operating conditions, the water was then guided through the hollow filaments of the membrane module and was charged with hydrogen from the pressure tank without the formation of bubbles. The quantity of the charged hydrogen was continuously measured by means of a measuring system of Orbisphere Co. The operating conditions, such as the water flow rate, the water pressure, the pressure loss in the module, the flow rate in the module, the volume flow of the hydrogen, the hydrogen pressure and the amount of the dissolved hydrogen in the well water were determined and compiled in Table 1.

TABLE 1

| | Long Term Test of Hydrogen Introduction during Catalytic Nitrate Reduction | | | | | | | |
|---|---|---|---|---|---|---|---|---|
| Test | H$_2$O Flow Rate | Water Pressure | Pressure Loss Module | Flow Rate in the Module | Hydrogen Pressure | Dissolved Hydrogen | | Nitrate Reduction |
| No. | liter/hr | (bar) | (bar) | meter/sec | (bar) | ml/hr | liters/hr | mg/liter |
| 1.2.3.1. | 950 | 4.35 | 0.25 | 0.84 | 7.5 | 28.8 | 27.4 | 22 |
| 1.2.3.2. | 990 | 4.65 | 0.25 | 0.88 | 7.5 | 44 | 44.4 | 37 |
| 1.2.3.3. | 2010 | 4.4 | 0.35 | 1.79 | 7.5 | 17.9 | 37.6 | 15 |
| 1.2.3.4. | 2010 | 5.5 | 0.35 | 1.77 | 9.0 | 44.8 | 90.0 | 33 |
| 1.2.3.5. | 2000 | 6.0 | 0.35 | 1.76 | 9.0 | 22.7 | 45.4 | 19 |

1.2.2. Apparatus Used

The apparatus is indicated in FIG. 1 (devices for measuring the pressure and concentration as well as pumps were left out for reasons of clarity).

The module 1 with the hollow filaments 2 described in 1.2.1. has a feed line 3 which is connected with a water pump. By means of this water pump, well water can be pumped into the equipment.

A hydrogen pressure tank 4 is connected with the space surrounding the hollow filaments 2 of the module by way of a valve and the line 5. By way of a collector (not shown), a line 6 is connected with the hollow filaments 2. The line 6 leads into a reactor 7 which has a catalyst fill 8.

The catalytically treated water may be discharged from the reactor 7 by way of an outlet line 9. A carrier catalyst fill was used as the catalyst which was formed of particles on a base of aluminum oxide, impregnated with palladium and copper corresponding to the teaching of European Patent Document EP-A-0 359 074.

1.2.3. Implementation of the Process.

The process was carried out in a waterworks facility for producing drinking water. The well water taken from a The hydrogen-containing water was then guided into the reactor through the catalyst fill and was catalytically treated. In this case, the nitrate content was reduced by 60 to 90%. The example proves that the process according to the invention can easily be carried out over extended periods of time.

For the tests described in Table 1, the hydrogen flow was in the range of from 30 to 100 l/h, measured by means of a suspended solid particle flow meter, ROTA Co.

The nitrate content was reduced as indicated in Table 1. It is demonstrated that the dissolved H$_2$ was completely used for the reduction of nitrate and oxygen.

The denitrified oxygen-free water was guided for the oxygen enrichment in a circulatory manner from a tank by way of a pump through a mode made of 8 of the hollow filaments produced according to Example 1. The membrane surface was 0.0083 m$^2$. In this case, the water was guided through the interior of the hollow filaments. On the exterior side, the hollow filaments were acted upon by pure oxygen. The Reynolds Number of the water was 3.150. The pressure in front of the module was 1.42 bar, behind the module, it was 0.29 bar. The temperature of the water was 20° C. The oxygen charges in the case of different partial pressures in the gas space are compiled in Table 2.

TABLE 2

Oxygen Charge As a Function of the Partial Pressure

| $P_{O2}$ bar | $J_{O2}$ (g/m$^2$h) |
|---|---|
| 0.42 | 24 |
| 0.58 | 28 |
| 0.72 | 32 |
| 0.87 | 38 |
| 1.01 | 48 |

We claim:

1. A method for introducing hydrogen through a membrane into an aqueous liquid without forming bubbles, wherein said membrane has an integral-asymmetrical structure and comprises a) a carrier formed of a porous polymer, and b) at least one layer of a non-porous polymer on one side of said carrier; and wherein said aqueous liquid contacts said membrane on the side of the non-porous polymer layer.

2. A method according to claim 1, wherein said carrier structure is formed of polyetherimide.

3. A method according to claim 1, wherein said non-porous polymer layer is made of a hydrophobic non-porous polymer.

4. A method according to claim 3, wherein said hydrophobic non-porous polymer is a silicone polymer.

5. A method according to claim 1, wherein said non-porous polymer layer has a thickness of from 0.1 to 100 micrometers.

6. A method according to claim 1, wherein said membrane is constructed as a flat membrane.

7. A method according to claim 1, wherein said membrane is constructed as a tubular membrane.

8. A method according to claim 7, wherein said non-porous polymer layer is arranged interiorly of said tubular membrane.

9. A method according to claim 1, wherein said membrane is constructed as a hollow filament.

10. A method according to claim 9, wherein said non-porous polymer layer is arranged interiorly of said hollow filament.

11. A method according to claim 1, wherein said aqueous liquid is water containing at least one dissolved substance selected from the group consisting of oxygen, nitrites and nitrates, and wherein said dissolved substance is catalytically reduced by the hydrogen introduced into said aqueous liquid.

* * * * *

UNITED STATES PATENT AND TRADEMARK OFFICE
CERTIFICATE OF CORRECTION

PATENT NO. : 5,523,003
DATED : June 4, 1996
INVENTOR(S) : Michael Sell et al.

It is certified that error appears in the above-indentified patent and that said Letters Patent is hereby corrected as shown below:

On the title page, item [73],
Please insert the second assignee as follows:

GKSS Forschungszentrum Geesthacht GmbH
Geesthacht, Germany

Signed and Sealed this

Tenth Day of December, 1996

Attest:

BRUCE LEHMAN

Attesting Officer                Commissioner of Patents and Trademarks